US000001233H

United States Statutory Invention Registration [19]

[11] Reg. Number: H1233

[43] Published: Sep. 7, 1993

Ohki et al.

[54] OPTICAL INTEGRATED DEVICE FOR A REPRODUCING HEAD FOR MAGNETO-OPTICAL RECORD

[76] Inventors: Hiroshi Ohki; Masaaki Doi, both of c/o Nikon Corporation, Ohi-Seisakusho 6-3, Nishi Ohi 1-chome, Shinagawa-ku, Tokyo, Japan

[21] Appl. No.: 631,647

[22] Filed: Dec. 21, 1990

[30] Foreign Application Priority Data

Jan. 9, 1990 [JP] Japan ..... 2-2098

[51] Int. Cl.[5] ..... G11B 11/14

[52] U.S. Cl. ..... 369/44.12; 369/13; 369/110; 360/114; 385/14

[58] Field of Search ..... 350/96.10, 96.11, 96.12, 350/96.13, 96.14, 96.15, 375-378; 369/43, 44.11, 44.12, 44.14; 385/14

[56] References Cited

U.S. PATENT DOCUMENTS

| | | | |
|---|---|---|---|
| 3,952,265 | 4/1976 | Hunsperger | 372/50 |
| 4,773,063 | 9/1988 | Hunsperger et al. | 385/14 X |
| 4,796,226 | 1/1989 | Valette | 350/375 X |
| 4,833,561 | 5/1989 | Sunagawa et al. | 369/44.12 X |
| 4,991,160 | 2/1991 | Premji | 369/44.12 |
| 5,011,248 | 4/1991 | Taki | 350/96.11 |

FOREIGN PATENT DOCUMENTS 1-134730 5/1989 Japan .

OTHER PUBLICATIONS

Masuda, M. et al, "An optical TE-TM mode splitter using a $LiNbO_3$ branching waveguide," Appl. Phys. Lett. 37(1), Jul. 1, 1980, pp. 20-23.

Yap, D. et al, "Passive Ti:$LiNbO_3$ channel waveguide TE-TM mode splitter," Appl. Phys. Lett 44(6), Mar. 15, 1984, pp. 583-585.

Alferness, Rod C., "Electrooptic Guided-Wave Device for General Polarization Transformations," IEEE Journal of Quantum Electronics, vol. QE-17, No. 6, Jun. 1981, pp. 965-969.

*Primary Examiner*—Bernarr E. Gregory

[57] ABSTRACT

An optical integrated device for a reproducing head for a magneto-optical record includes two devices formed on separate substrates. A first device includes a polarization detecting optical system, and a second device includes a polarized light source and photoelectric conversion means. The optical integrated device further includes link means for linking the first and second devices in proximate or close contact.

2 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL INTEGRATED DEVICE FOR A REPRODUCING HEAD FOR MAGNETO-OPTICAL RECORD

BACKGROUND OF THE INVENTION

1. Field of the Invention

The present invention relates to an optical integrated device for a reproducing head for magneto-optical record.

2. Related Background Art

Recently, efforts have been made to develop an optical recording method which satisfies various requirements including high density, high capacity, high accessing speed and high recording/reproducing speed.

Among various optical recording methods, magneto-optical recording is most attractive because it allows erasure after recording (reproducing) information and repeated recording of new information.

A record medium used in the magneto-optical recording has a single-layer or multi-layer vertical magnetization film as a record layer. The magnetization film may be made of amorphous GdFe, GdCo, GdFeCo, TbFe, TbCo or TbFeCo. The record layer usually has concentric or helical tracks on which information is recorded.

The information to be recorded is previously binarized and it is recorded by two signals, one bit having upward magnetization to the film plane and the other bit having downward magnetization. Since those bits correspond to the digital signals "0" and "1", the former is called "0" bit and the latter is called "1" bit.

However, usually, the magnetization of the track on which the information is to be written is aligned to "upward", for example, by applying a strong external magnetic field prior to recording. This process is called an initialization. Thereafter, the "1" bits having the downward magnetization are formed on the track. The information is recorded by the presence or absence and/or the bit length of the downward "1" bit.

An optical head used to reproduce the magneto-optical record has a complex structure in order to detect "0" and "1" bits. FIG. 1 shows a conceptual view of an optical head which uses a most typical differential detection system.

A laser diode 31 is usually used as a polarized light source. A laser beam emitted by the laser diode 31 has an oval light beam sectional plane as shown in FIG. 2(*a*) when it is taken along a line A—A′ of FIG. 1. A polarization plane is parallel to a minor axis as shown by arrows in FIG. 2.

The laser beam is then directed to a collimator lens 32, which collimates the laser beam. The collimated beam is directed to a first prism 33 and a second prism 34. Those prisms function to shape the sectional shape of the beam from oval to real circle. They are arranged in a predetermined attitude. The sectional plane and the polarization plane of the beam transmitted through the prisms 33 and 34 are shown in FIGS. 2(*b*) and 2(*c*), respectively. As seen from the figure, the polarization plane is not rotated.

The shaped beam is then directed to a main beam splitter 35, which guides light reflected by a record medium (MO) to a detecting optical system.

The beam transmitted through the beam splitter 35 is focused by an objective lens 36 and directed to the record medium (MO).

The directed beam is reflected by the record medium (MO) to go back along the same path. However, the reflected light has the polarization plane rotated by an angle $\theta_k$. (This phenomenon is called a Kerr effect.) The rotation of the polarization plane is clockwise ($+\theta_k$) or counterclockwise ($-\theta_k$) depending on whether the beam is directed to the "0" bit (upward magnetization) or "1" bit (downward magnetization). This is shown in FIGS. 3(*a*) and 3(*b*), whether the rotation is $+\theta_k$ or $-\theta_k$ depending on the upward magnetization or downward magnetization depends on the type of magnetic material. (In FIG. 3, $-\theta_k$ for "0" bit and $+\theta_k$ for "1" bit.)

The beam reflected by the medium again passes through the objective lens 36 and is directed to the main beam splitter 35 where it is split into two parts, one being directed to the light source 31 and the other to the detecting optical system.

The beam directed to the detecting optical system is directed to a one-half wavelength plate 37 which has an optical axis thereof inclined by 22.5 degrees to the polarization plane of the incident light. As a result, the polarization plane is rotated by $\alpha=22.5\times2=45$ degrees. The angle 45 degrees is the value used in a most conventional method called a 45 degrees differential method. In an asymmetric differential method, the angle $\alpha$ is set to $10\sim15$ degrees. The rotated beams are shown in FIGS. 3(*c*) and 3(*d*).

The beam is then directed to a polarization beam splitter 38 where it is split to a P component and an S component. The S component of a light vector is shown by solid line arrows in FIGS. 4A and 4B. Broken line arrows show the polarization direction of the beam before the rotation. It is seen that the magnitude of the S component changes depending on whether the beam is the reflected beam from "0" bit (FIG. 4A) or the reflected beam from "1" (FIG. 4B).

On the other hand, the P component of the light vector is shown by solid line arrows in FIGS. 5A and 5B. Broken line arrows show the polarization direction of the beam before the rotation. Again, the magnitude of the P component changes depending on whether the beam is the reflected beam from "0" bit (FIG. 5A) or the reflected beam from "1" bit (FIG. 5B).

One of the split S component and P component is then directed to a first detector 39 while the other is directed to a second detector 40, where they are converted to electrical signals, respectively.

The converted electrical signal is proportional to the square of the S component or P component. Accordingly, an output from the first photoelectric converter 39 or the second photoelectric converter 40 changes depending on whether the split component of the reflected beam from "0" bit is received or that from "1" bit is received. Accordingly, the information recorded on the record medium (MO) is reproduced in the form of an electrical signal.

Since the AC components of the outputs of the first photoelectric converter 39 and the second photoelectric converter 40 are of opposite phase, the AC output is doubled by differentiating both outputs and noise due to the fluctuation of the light source 31 is also eliminated. This is a principle of the differential method. The outputs of the first photoelectric converter 39 and the second photoelectric converter 40 are supplied to a differential amplifier (not shown).

The number of components of the reproducing head for the magneto-optical record is as many as ten for the optical head shown in FIG. 1, and hence problems of difficulty in reducing the size of the head, heavy weight, high manufacturing cost and time-consuming work for mounting and fixing the parts are encountered.

An optical integrated device for a monolithic reproducing head for a magneto-optical record in which all parts are formed on a single substrate has been proposed. For example, reference is made to FIG. 2 of Japanese Laid-Open Patent Application No. 1-134730.

However, many problems must be solved in putting the device into practice. In the optical integrated device, a crystal layer such as lithium niobate for forming a polarization optical system which utilizes an electro-optical effect and a GaAs crystal layer for forming a light source and a photoelectric converter are required. However, because of different crystalline structures of those crystals, it is not possible by the present technology to manufacture a substrate on which both crystals are stocked.

SUMMARY OF THE INVENTION

It is an object of the present invention to solve the above problem as much as possible by the current technology. To this end, the present invention first provides an optical integrated device for a reproducing head for a magneto-optical record, comprising:

a first device (1) having a polarization detecting optical system;

a second device (2) having a polarized light source and a photoelectric converter; and link means (3) for linking said first and second devices in a proximate or close contact.

Secondly, the present invention provides an optical integrated device described above wherein:

said first device (1) comprises;

a first wave guide having a light entry port on a first end plane of a first substrate and a light exit port on a second end plane of the first substrate for coupling the light entry port and the light exit port;

a second wave guide branching from said first wave guide at a first branch point and extending to a second branch point;

third and fourth wave guides branching from said second wave guide at the second branch point and having light exit ports on the first end plane;

a first mode splitter provided at the first branch point;

a polarization plane rotating element provided along said second wave guide; and a second mode splitter provided at the second branch point;

said second device (2) comprising;

a polarized light source having a light exit port on an end plane of a second substrate;

a first photoelectric converter having a light entry port on the end plane of the second substrate; and a second photoelectric converter having a light entry port on the end plane of the second substrate;

said first device (1) and said second device (2) being linked by said link means (3) in a proximate or close contact such that the light entry port of said first wave guide and the light exit port of said polarized light source, the light exit port of said third wave guide and the light entry port of said first photoelectric converter, and the light exit port of said fourth wave guide and the light entry port of said second photoelectric converter align, respectively.

In accordance with the present invention, the polarization detecting optical system which utilizes the electro-optical effect is formed in a first device (1), and the light source and the photoelectric converter are formed in a second device (2), separately by function so that each device can be manufactured by the current technology. By coupling both devices by conventional coupling means, the optical integrated device for the reproducing head can be readily assembled.

The second device (2) per se is known as a dual mode detector, for example. Reference is made to U.S. Pat. No. 3,952,265. In this device, the polarization light source and the photoelectric converter are of the same construction, and the latter is oppositely biased to the former to attain the photoelectric conversion function.

In the present invention, the elements which can be formed on one substrate by the present technology are assembled on the same substrate (that is, the polarization optical system is formed on the first device while the polarization light source and the photoelectric converter are formed on the second device). Accordingly, only two substrates are needed and the number of parts required is very small because only the coupling of both substrates are required. As a result, the size of the head, weight and manufacturing cost are reduced.

Further, the elements corresponding to the optical parts in the prior art can be mechanically mounted and fixed on the substrate by using the semiconductor manufacturing technique. Accordingly, the mounting, adjusting and fixing works are not necessary.

DETAILED DESCRIPTION OF THE PREFERRED EMBODIMENTS

Figure 1:
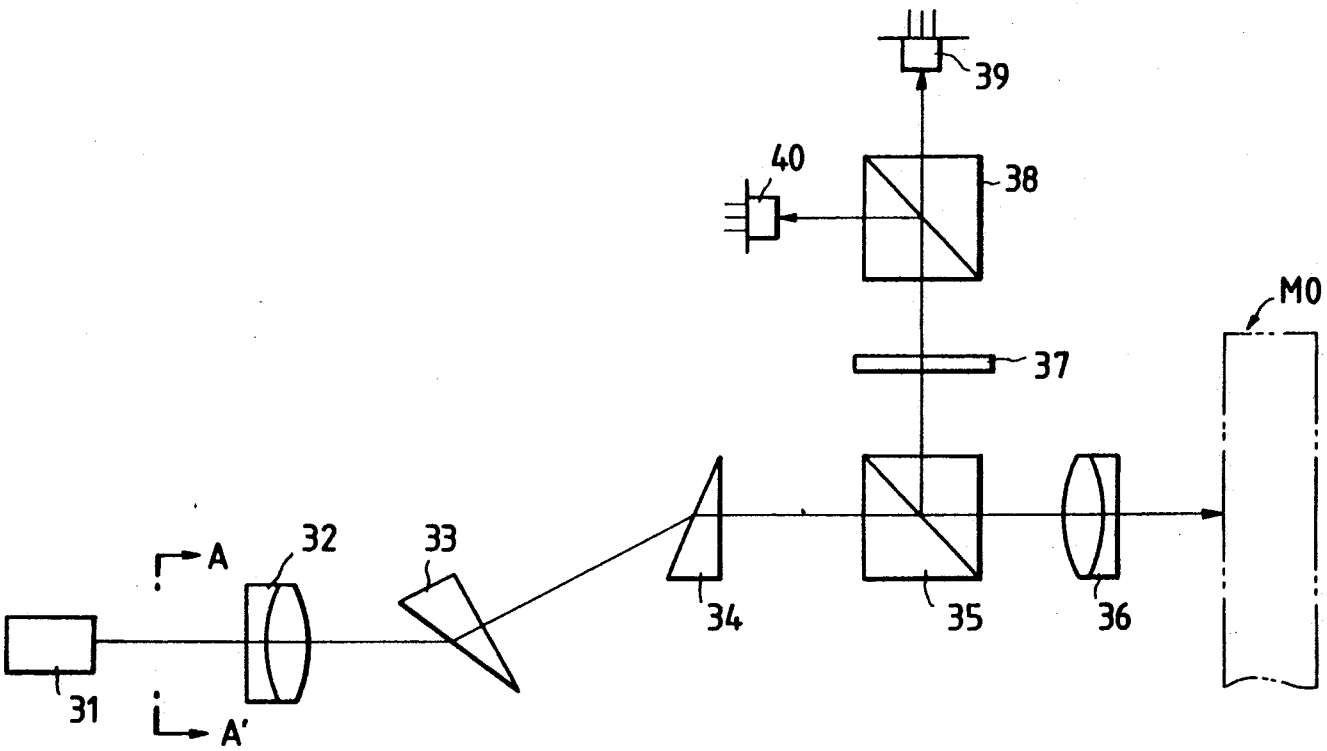
FIG. 1 PRIOR ART
FIG. 1 shows a conceptional view of a main portion of a prior art reproducing head for a magneto-optical record.
Figure 2:
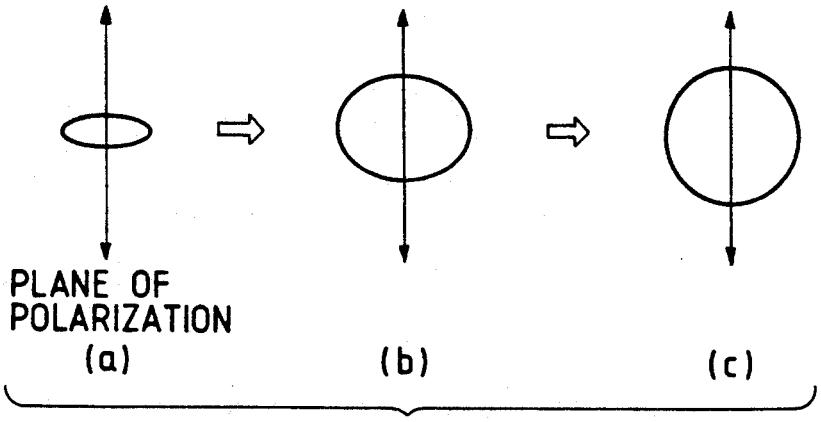
FIG. 2 PRIOR ART
FIG. 2 shows a change in sectional shapes of laser beams upstream of a collimator lens 32 of FIG. 1 (at a plane designated by line A—A'), downstream of a first prism 33 and downstream of a second prism 34 and polarization planes (shown by , FIG. 3 shows rotation of the polarization plane in the construction of FIG. 1, FIGS. 4A and 4B show the magnitude of an S component split from the polarized beam in the construction of FIG. 1, FIGS. 5A and 5B show the magnitude of a P component split from the polarized beam in the construction of FIG. 1.
Figure 3:
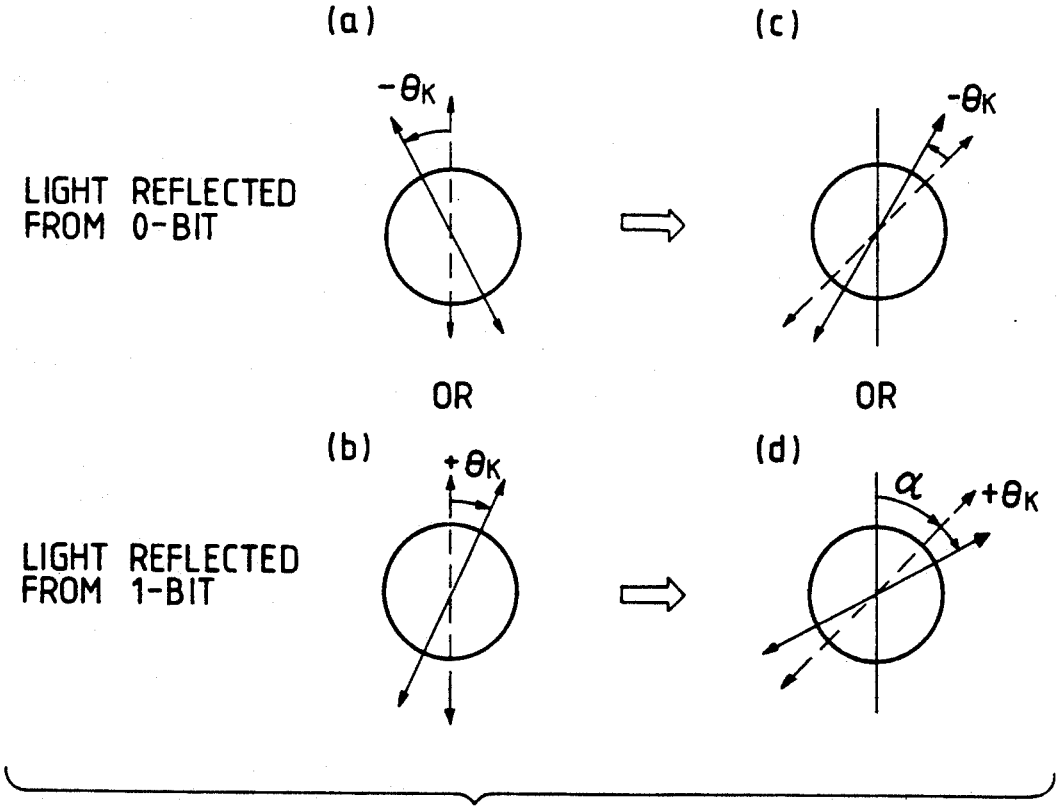
FIG. 3 PRIOR ART
Figure 4A:
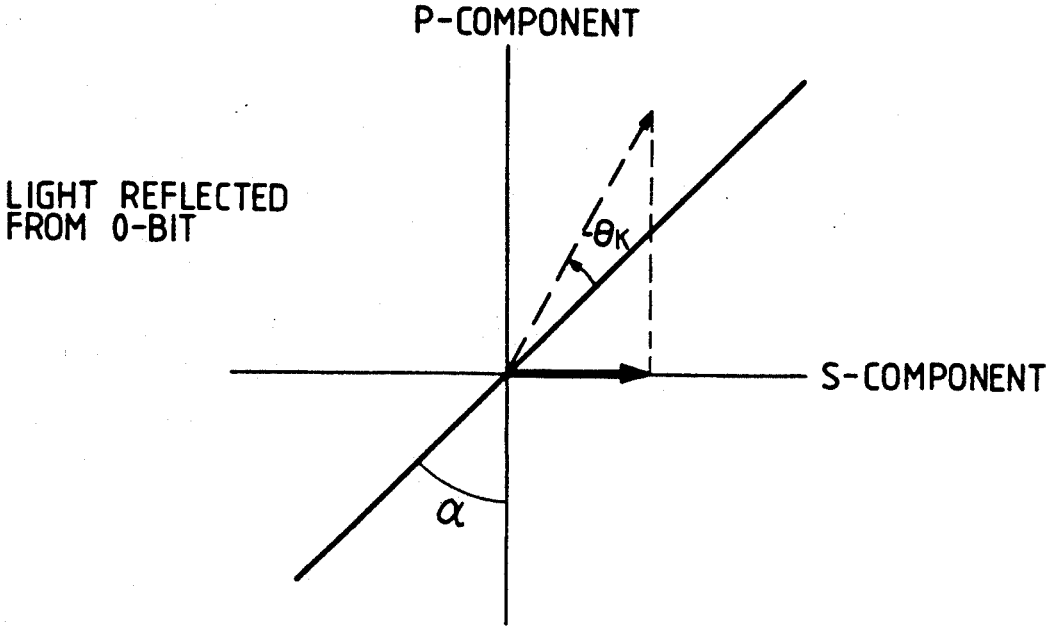
FIG. 4A PRIOR ART
Figure 4B:
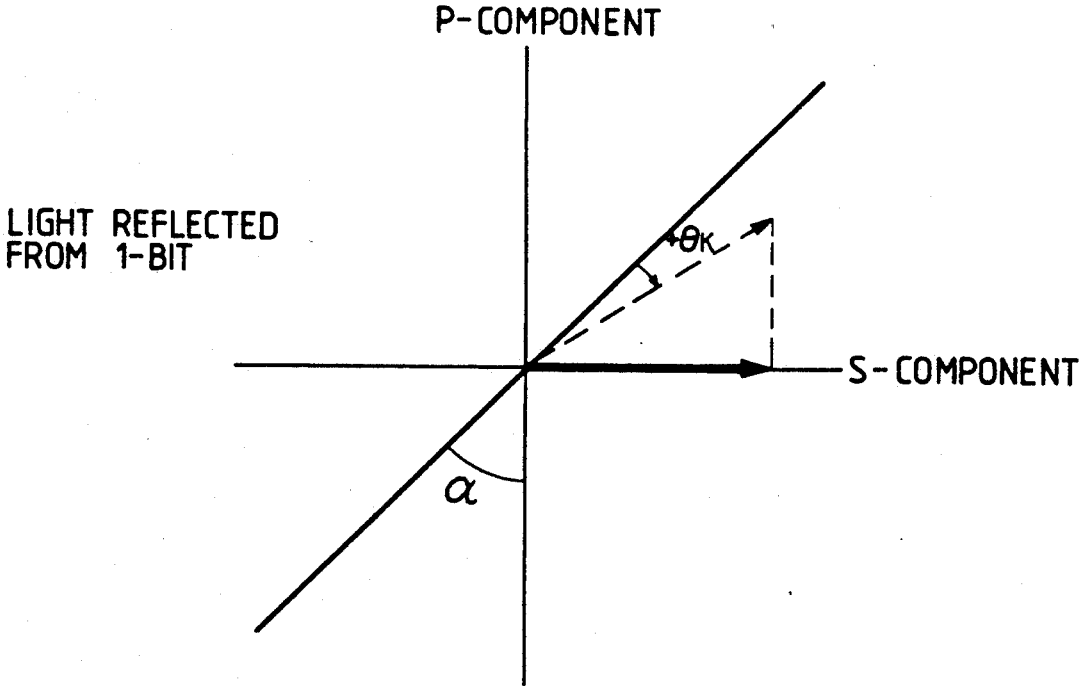
FIG. 4B PRIOR ART
Figure 5A:
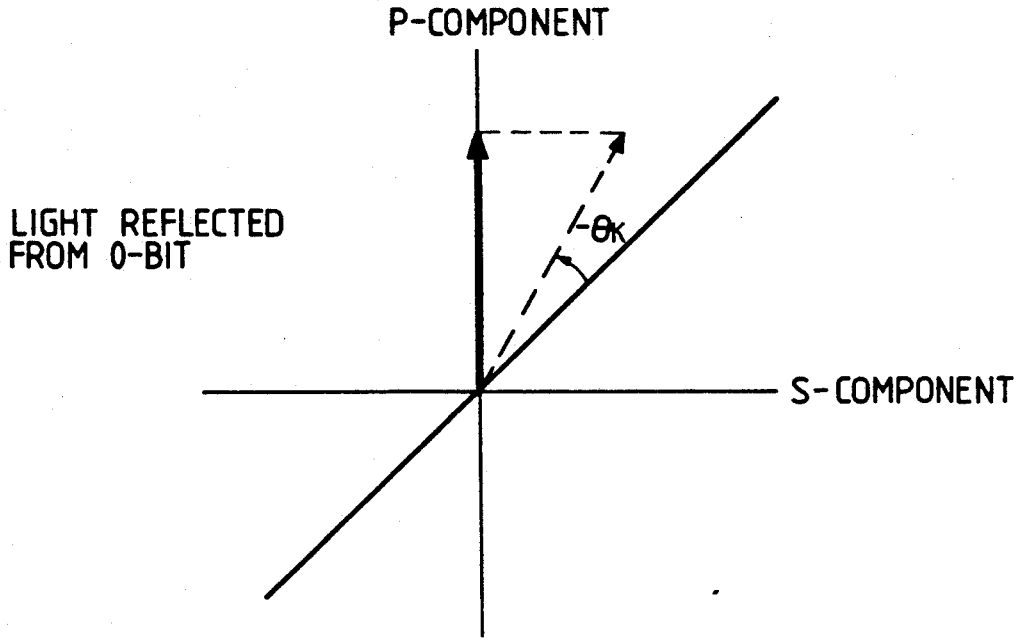
Figure 5B:
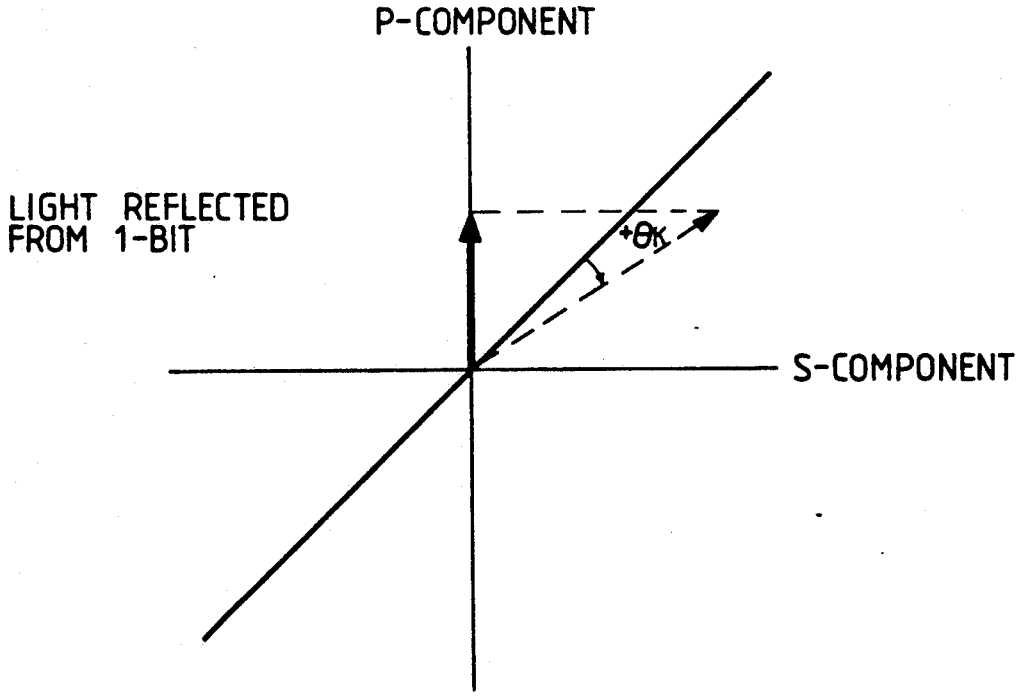
Figure 6:
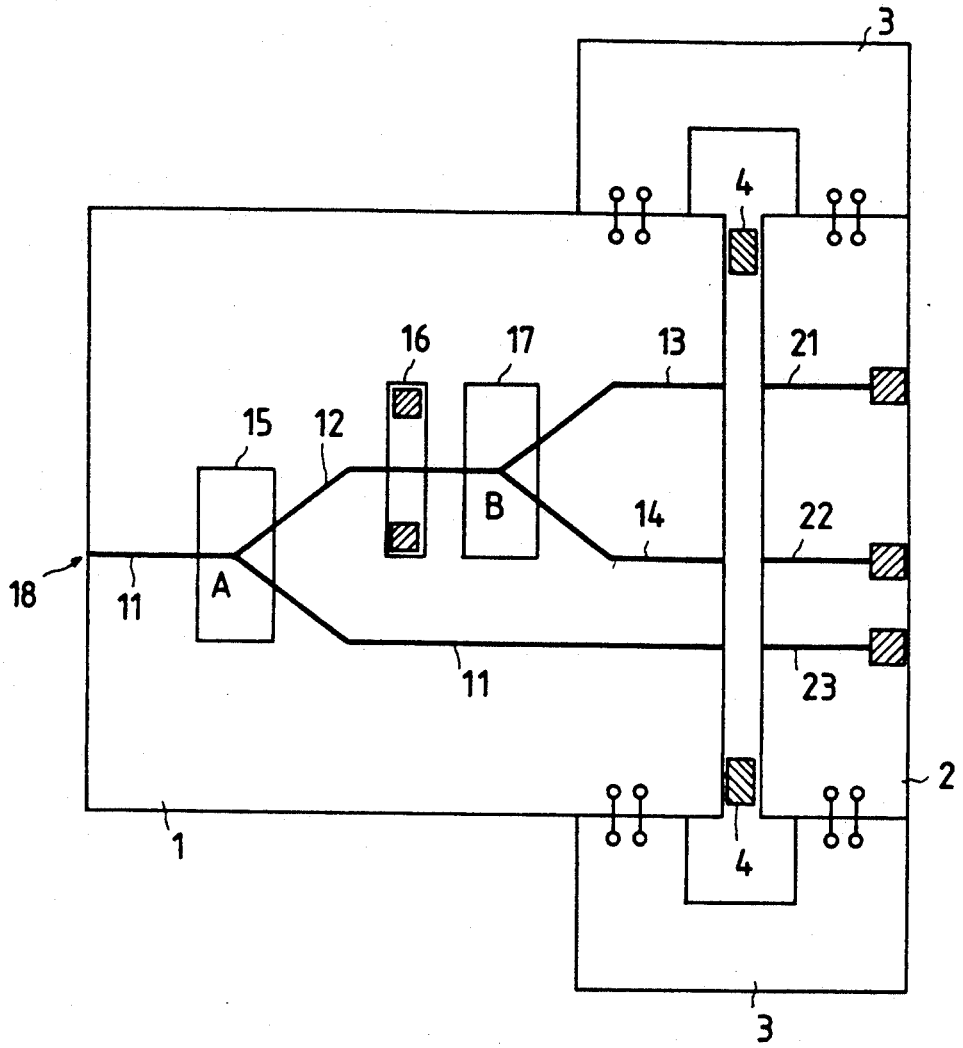
FIG. 6 shows a schematic plan view of an optical integrated device in accordance with an embodiment of the present invention.

Referring to FIG. 6 which shows a schematic view of an optical integrated device in accordance with an embodiment of the present invention, a first device (1) is formed on a lithium niobate crystal substrate having an electro-optical effect. Formed on this substrate are a first wave guide 11, a second wave guide 12 which branches from the first wave guide at a first branch point A and extends to a second branch point B, a third wave guide 13 and a fourth wave guide 14 which branch from the second wave guide at the second branch point B.

The first wave guide 11 has a light entry (and exit) port 18 on an end plane (second end plane) of the substrate, and a light exit port on another end plane (first end plane). The third wave guide 13 and the fourth wave guide 14 have light exit ports on the first end plane.

A first mode splitter 15 is provided at the first branch point A. A polarized beam emitted from light port 18 after passing the first branch point A is reflected by a record medium and the reflected light containing information is directed through the same light port 18 and reaches the first branch point A. The first mode splitter 15 functions not to direct the polarized component by the Kerr rotation effect (Kerr rotation component) contained in the reflected light to the first wave guide 11 but to direct it to the second wave guide 12.

Figure 7:
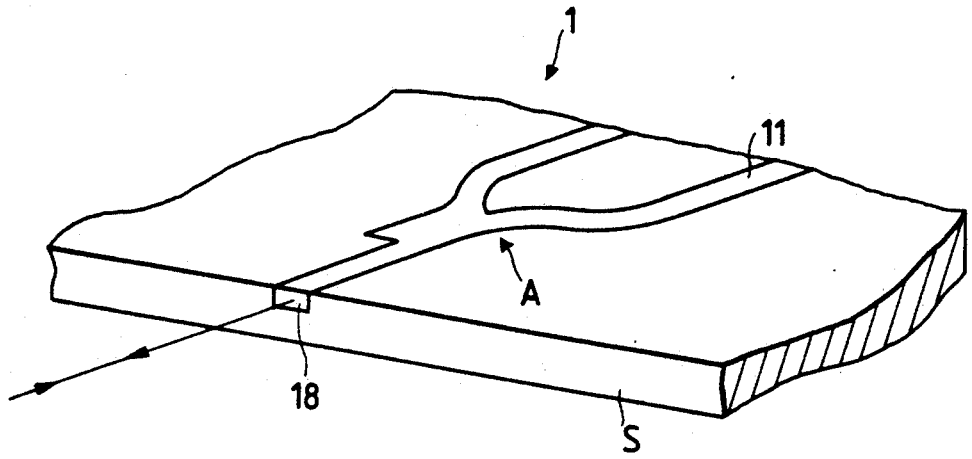
FIG. 7 shows a schematic view of a known mode splitter used in a first device.

The mode splitter per se is known (For example Appl. Phys. Lett. 37 (1), pp 20–23, Jul. 1, 1980 and Appl. Phys. Lett. 44 (6), pp 583–585, Mar. 15, 1984). FIG. 7 shows a schematic view thereof. The mode splitter may be a conventional passive mode splitter but an active mode splitter having an electrode may be used to improve the selectivity of polarization. The latter uses an electro-optical effect of the substrate and the selectivity (branch ratio) of polarization can be finely adjusted by controlling an applied voltage. In the conventional passive mode splitter, it is difficult to direct 100% of the Kerr rotation component of the reflected light from the record medium to the second wave guide 12. Thus, a known active branch ratio enhancing element or active branch ratio adjusting element may be provided between the first branch point A of the first wave guide 11 and the light port 18. This element can adjust the branch ratio of the reflected light to be directed to the second wave guide 12 and the first wave guide 11 by controlling a voltage.

Along the second wave guide 12, a polarization plane rotating element 16 is provided. It rotates the polarization plane of the reflected light from the record medium by approximately 10–80 degrees, preferably approximately 45 degrees.

The polarization plane rotating element per se is known (for example, Journal of Quantum Electronics, Vol. QE-17, No. 6, pp 965–969, June 1981). It comprises a phase shifter for shifting a phase of a TE-TM mode by 90 degrees and a mode converter (which converts the TE mode to the TM mode) arranged in a succeeding stage. They have electrodes of periodic structure (shown by hatched squares in FIG. 6) on both sides of the wave guide. By applying an appropriate voltage, the polarization plane can be rotated to a desired angle.

A second mode splitter 17 is formed at the second branch point B at which the second wave guide 12 terminates. The reflected light having the polarization plane thereof rotated is branched (split) to the third wave guide 13 and the fourth wave guide 14 and exits from the exit ports on the second end plane through the respective wave guides toward the second device (2).

The second device (2) is formed on a GaAs crystalline substrate. Since a polarized light source including wave guide 23 and photoelectric converters including wave guides 21 and 22 are of the same construction, the manufacture is facilitated. The former and the latter can be switched by merely reversing the polarity of the bias voltage applied to the electrodes (shown by hatched squares in FIG. 6).

The first device (1) and the second device (2) are linked by conventional link means, for example, screws, bolts and nuts, or bonding material, for close contact or through a spacer 4 (with an air gap of 1 ~ 100 microns, for example). The first device (1) and the second device (2) are linked such that the light entry port of the first wave guide 11 and the light exit port of the polarized light source 23, the light exit port of the third wave guide 13 and the light entry port of the first photoelectric converter 21, and the light exit port of the fourth wave guide 14 and the light entry port of the second photoelectric converter 22 align respectively.

The polarized light source 23 may be used as a recording beam source as it is (although power amplification may be usually required) and the first wave guide 11 may be used as a recording beam path to use the optical integrated device of the present embodiment in a record operation.

The first device may also include a recording beam wave guide, a tracking optical system and focusing optical system, and the second device may additionally include a light source and photoelectric converters.

We claim:

1. An optical integrated device for a reproducing head for a magneto-optical record, comprising:

a first device having a polarization detecting optical system on a first substrate;

a second device having a polarized light source and a photoelectric converter on a second substrate separate from the first substrate;

both the first and second devices being monolithically integrated devices; and link means for linking said first and second substrates in a proximate or close contact.

2. An optical integrated device according to claim 1 wherein:

said first device comprises;

a first wave guide having a light entry port on a first end plane of said first substrate and a light exit port on a second end plane of the first substrate;

a second wave guide branching from said first wave guide at a first branch point and extending to a second branch point;

third and fourth wave guides branching from said second wave guide at the second branch point and having light exit ports on the first end plane;

a first mode splitter provided at the first branch point;

a polarization plane rotating element provided along said second wave guide; and a second mode splitter provided at the second branch point;

said second device comprising;

a polarized light source having a light exit port on an end plane of said second substrate;

a first photoelectric converter having a light entry port on the end plane of the second substrate; and a second photoelectric converter having a light entry port on the end plane of the second substrate;

said substrates being linked by said link means in said proximate or close contact such that the light entry port of said first wave guide and the light exit port of said polarized light source, the light exit port of said third wave guide and the light entry port of said first photoelectric converter, and the light exit port of said fourth wave guide and the light entry port of said second photoelectric converter align, respectively.

* * * * *